United States Patent Office 3,758,344
Patented Sept. 11, 1973

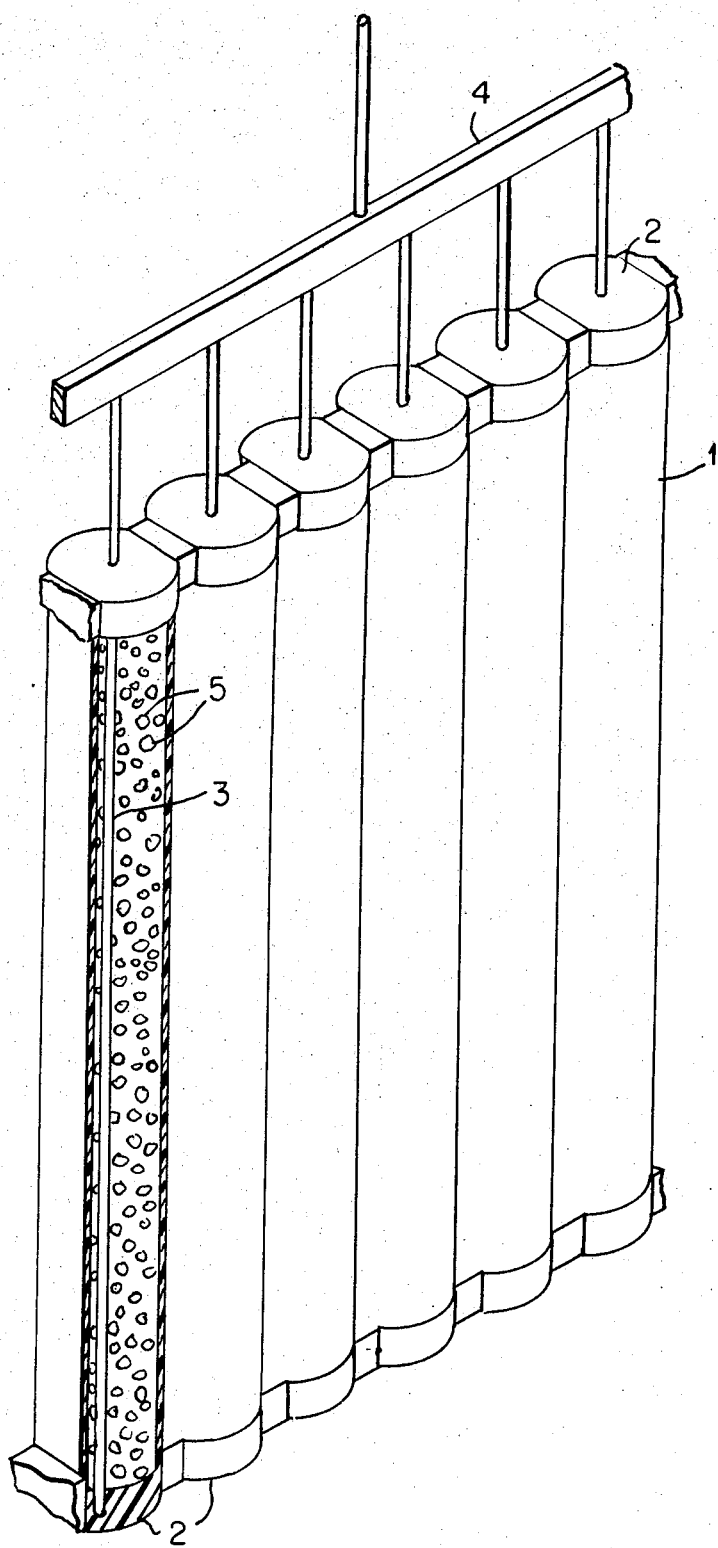

3,758,344
METHOD OF PRODUCING AN ELECTROLYTIC-CELL ELECTRODE WITH ACTIVE IRON MASS
Antony Oliapuram, Frankfurt am Main, Germany, assignor to Varta Aktiengesellschaft, Frankfurt am Main, Germany
Filed Aug. 10, 1971, Ser. No. 170,446
Claims priority, application Germany, Oct. 30, 1970, P 20 53 362.4
Int. Cl. H01m 13/08
U.S. Cl. 136—120 FC                    7 Claims

ABSTRACT OF THE DISCLOSURE

An electrode for metal-air battery or like electrolytic cells is made by filling a granular active iron mass into a microporous and lye-resistant envelope tube of synthetic plastic web material and thereafter subjecting the iron-filled envelope tube to a currentless nickel bath to thereby coat the iron mass with a nickel layer permeable to electrolyte.

---

My invention relates to electrodes with an active iron mass for metal-air cells and other electrolytic cells, as well as to a method for producing such electrodes.

Various applications of electric accumulator techniques require using electrodes of large area capacity. For example, oxygen electrodes theoretically have an unlimited high operating capacity since the depolarizer is continuously replenished. For economical use, the negative electrode must likewise possess a correspondingly high capacity. For example, if an oxygen electrode were to be used that can be loaded with 100–200 ma./cm.$^2$, then the negative electrode, at a current area density of 100 ma./cm.$^2$, would have to have a minimum capacity of 500 ma.h./cm.$^2$ if a 5-hour charging period is required.

In metal-air cells, porous metal electrodes containing catalysts have been used as positive electrodes, the negative electrodes consisting for example, of zinc, cadmium and iron.

When using zinc as active mass the required capacity can readily be attained. The zinc going into solution during discharge of the cell is segregated in subsequent charging periods in sponge or dendritic form. Unfortunately, such zinc sponge adheres very poorly to the electrode and grows through the separator which keeps the electrodes of different polarities apart from each other. Consequently, the attainable number of charging-discharging cycles is very limited.

Tests made with cadmium have shown that with a sufficient thickness of the cadmium electrode the required capacity of 500 ma.h./cm.$^2$ is likewise obtainable. However, aside from the considerably higher cost of cadmium, the cadmium electrode deteriorates after but a few cycles and thereby suffers a very large reduction in capacity.

An electrode that contains iron as its active mass is distinguished by good chargeability and low manufacturing cost. However, the yield is very slight, being maximally at 25–30%, and even this slight yield is feasible only with thin electrodes. If, for increasing area capacity, one increases the thickness of the conventional iron electrode, the yield decreases greatly.

It is an object of my invention to obviate these disadvantages of negative electrodes and to provide an improved electrode that not only possesses a high yield but also has a high capacity which remains constant during a large number of charging-discharging cycles.

Another object of my invention is to devise an electrode generally of the above-mentioned type which, used in a battery cell, secures a lower, internal resistance of the cell as compared with those heretofore known.

Still another object of my invention is to provide an economical method of producing such improved electrodes, the method to be sufficiently simple and reliable for industrial application and mass production of the electrodes.

To achieve these objects and in accordance with a feature of my invention, I provide the electrode with an envelope tube of web material or the like which is formed of microporous and lye-resistant synthetic plastic, and fill the active iron mass in granular form into the envelope tube. Thereafter the filled tube is subjected to a currentless nickel bath and thereby coated with a thin nickel layer permeable to the electrolyte.

The above-mentioned and further objects, advantages and features of my invention, said features being set forth with particularity in the claims annexed hereto, will be apparent therefrom the following description in conjunction with the accompanying drawing in which the single illustration presented thereon is a perspective view illustrating by way of example an embodiment of an electrode according to the invention.

The porous plastic tubes 1, of which one is shown cut open to reveal the interior, are closed on top and at the bottom by respective stoppers 2 of synthetic plastic. The top stoppers 2 have a center bore for the passage of respective cell conductors 3 consisting of copper or nickel. The tubes 1 of plastic web material as well as the stoppers 2 are resistant to lye and consist, for example, of polyvinylchloride or polyethylene.

The conductors 3 are interconnected at one side of the electrode arrangement by a transverse bar 4. The interspace between the inner jacket surface of each tube 1 and the axially extending conductor 3 is filled with the granules of the active iron mass 5, which is stamped into the tube and thus compacted to a density of approximately 2.3 to 2.5 g./cm.$^3$. The granules preferably have an average diameter of 5 to 15$\mu$ and consist of metallic iron and magnetite.

Subsequently the entire iron electrode is immersed in a currentless nickel bath with a nickel content of 0.3 to 0.6%. For example, the significant constituent of such an aqueous bath may be as follows:

| | |
|---|---|
| $2Ni \cdot CO_3 \cdot 3Ni(OH)_2 \cdot 4H_2O$ | g./l__ 10 |
| 70% hydrofluoric acid | ml./l__ 6 |
| Citric acid | g./l__ 5.5 |
| $NH_4HF_2$ | g./l__ 15 |
| $NaH_2PO_2 \cdot H_2O$ | g./l__ 20 |
| 30% ammonia | ml./l__ 30 |

The pH value of such a bath is in the neighborhood of 6.5, and the temperature is preferably 80 to 90° C.

Any immersion period from ½ to 1 hour has been found very advantageous. The individual granules of the active iron mass are thus coated with a thin nickel layer of approximately 5 to 10$\mu$. Such a thin coating of nickel is still sufficiently porous to secure a good contact of the active iron mass with the electrolyte and, on the other hand, is sufficiently thick for good electrical conductance of the individual granules and for securing a slight internal resistance of the cell.

With a negative electrode made according to the invention, the internal resistance of a metal-air cell is very small. To attain a large area capacity the diameter of the individual envelope tubes may be increased up to about 8.5 mm. without substantially reducing the yield. Thus, an electrode made according to the invention and containing 10 g. active mass in an envelope tube of synthetic plastic web material having a length of 8 cm. and a diameter of 8.4 mm., was measured to have a yield of 40% and a substantially constant capacity throughout 1300 cycles. An electrode not made according to the invention, subjected to the same test conditions, exhibited a yield of only 13%. Another electrode made according to the invention and containing 320 g. mass in an envelope tube of 16 cm. length and 8.4 mm. diameter, exhibited a yield of 35% without appreciable loss of capacity throughout 300 cycles.

As shown on the drawing, the filled envelope tubes pertaining to one and the same electrode may be joined lengthwise together. They preferably are formed by pockets of two sheets of the microporous plastic material, the sheets being fused or otherwise joined together along parallel lines. The resulting pockets between each two adjacent lines are then widened to individual pockets. In this form, electrodes according to the invention lend themselves particularly well to being industrially manufactured by mass production, for example in the manner and with the aid of machinery illustrated and described in the application of J. Sucher et al., Ser. No. 87,271 filed Nov. 5, 1970.

To those skilled in the art it will be obvious upon a study of this disclosure that with respect to shape, arrangement and other details, an electrode according to the invention may be modified in various ways and hence may be given embodiments other than particularly illustrated and described herein, without departing from the essential features of my invention and within the scope of the claims annexed hereto.

I claim:

1. The method of producing an electrode with an active iron mass in a tubular envelope for a metal-air cell, which comprises the steps of filling a microporous and lye-resistant envelope tube of synthetic plastic web material with an iron mass in granular form, thereafter subjecting the iron-filled envelope tube to a currentless nickel bath and thereby coating the granules of the iron mass with a nickel layer permeable to electrolyte.

2. The method of claim 1, wherein the iron granules have an average diameter of about 5 to $15\mu$.

3. The method of claim 2, which comprises compressing the iron granules in the tube to a mass density of about 2.3 to 2.5 g./cm.$^3$ before coating the granules.

4. The method according to claim 2, wherein the granules consist of metallic iron and magnetite.

5. The method of claim 1, wherein the filled tube is subjected to the nickel bath until the nickel layer has a thickness of 5 to $10\mu$.

6. The method of claim 1, wherein the nickel bath has a nickel content of about 0.3 to about 0.6% by weight.

7. The method according to claim 1, wherein the iron granules have an average diameter of about 5 to $15\mu$ and the iron-filled tube is submerged in said nickel bath for about ½ to 1 hour, the bath having a nickel content of about 0.3 to about 0.6% by weight, a pH value of approximately 6.5 and a temperature of about 80 to 90° C.

References Cited
UNITED STATES PATENTS

| | | | |
|---|---|---|---|
| 3,305,401 | 2/1967 | Aulin et al. | 136—120 FC |
| 3,201,282 | 8/1965 | Justi et al. | 136—120 FC X |
| 3,260,576 | 7/1966 | Gruene et al. | 136—120 FC X |
| 3,099,586 | 7/1963 | Duddy | 136—43 |
| 3,317,347 | 5/1967 | Coleman et al. | 136—28 |
| 2,646,456 | 7/1953 | Jacquier | 136—28 |

FOREIGN PATENTS

| | | | |
|---|---|---|---|
| 232,935 | 7/1959 | Australia | 136—120 FC |

L. DEWAYNE RUTLEDGE, Primary Examiner

M. J. ANDREWS, Assistant Examiner

U.S. Cl. X.R.

117—227   100 M, 130 E